United States Patent
Zhou et al.

(10) Patent No.: US 10,225,613 B2
(45) Date of Patent: Mar. 5, 2019

(54) METHOD AND APPARATUS FOR VIDEO PLAYING PROCESSING AND TELEVISION

(71) Applicants: HISENSE ELECTRIC CO., LTD., Qingdao (CN); HISENSE USA CORPORATION, Suwanee, GA (US); HISENSE INTERNATIONAL CO., LTD., Qingdao (CN)

(72) Inventors: Jie Zhou, Qingdao (CN); Xiaohang Ma, Qingdao (CN)

(73) Assignees: Hisense Electric Co., Ltd., Qingdao (CN); Hisense USA Corporation, Suwanee, GA (US); Hisense International Co., Ltd., Qingdao (CN)

( * ) Notice: Subject to any disclaimer, the term of this patent is extended or adjusted under 35 U.S.C. 154(b) by 0 days.

(21) Appl. No.: 15/389,054

(22) Filed: Dec. 22, 2016

(65) Prior Publication Data

US 2018/0103296 A1  Apr. 12, 2018

(30) Foreign Application Priority Data

Oct. 11, 2016  (CN) .......................... 2016 1 0887438

(51) Int. Cl.
*H04N 5/445* (2011.01)
*H04N 21/472* (2011.01)
*H04N 21/44* (2011.01)
*H04N 21/6587* (2011.01)

(52) U.S. Cl.
CPC . *H04N 21/47217* (2013.01); *H04N 21/44004* (2013.01); *H04N 21/47202* (2013.01); *H04N 21/6587* (2013.01)

(58) Field of Classification Search
CPC ....... H04N 21/47217; H04N 21/44004; H04N 21/47202; H04N 21/6587
See application file for complete search history.

(56) References Cited

U.S. PATENT DOCUMENTS

| | | | |
|---|---|---|---|
| 8,849,101 B2* | 9/2014 | Rosser | G11B 27/005 386/343 |
| 9,940,746 B2* | 4/2018 | Pound | G06T 13/80 |
| 2002/0194354 A1* | 12/2002 | Bolduc | H04N 21/44004 709/231 |
| 2007/0016611 A1* | 1/2007 | Wang | G11B 27/34 |
| 2010/0303440 A1* | 12/2010 | Lin | H04N 5/76 386/241 |

(Continued)

*Primary Examiner* — John R Schnurr
(74) *Attorney, Agent, or Firm* — Brinks Gilson & Lione

(57) ABSTRACT

A method and an apparatus for video playing processing and a TV are provided. The method for video playing processing includes: initiating a second thread in parallel with a first thread if a preview operation is received, when the video is played by the first thread, wherein the preview operation is used for indicating a fast forward or fast backward operation on the video; obtaining, by the second thread, a video clip at a video playing position corresponding to the preview operation in the first thread; obtaining, by the second thread, at least one frame image decoded from the video clip; displaying, by the second thread, the at least one frame image on a playing screen of the video played by the first thread. In the process of the fast forward or fast backward, playing of the current video is not affected, resulting in a better user experience.

14 Claims, 3 Drawing Sheets

(56) References Cited

U.S. PATENT DOCUMENTS

2012/0070129 A1\* 3/2012 Lin ................ H04N 21/234327
 386/278
2015/0346984 A1\* 12/2015 Flint ................... G06F 3/04847
 715/720

\* cited by examiner

METHOD AND APPARATUS FOR VIDEO PLAYING PROCESSING AND TELEVISION

CROSS-REFERENCE TO RELATED APPLICATIONS

This application claims priority to Chinese Patent Application No. 201610887438.5, filed on Oct. 11, 2016 and entitled "Method and Apparatus for Video Playing Processing and Television", the contents of which are incorporated herein by reference in its entirety.

TECHNICAL FIELD

The present application relates to the technical field of video playing processing, and more particularly, to a method and an apparatus for video playing processing and a TV.

BACKGROUND

With the rapid development of science and technology, the smart TV is becoming more and more popular. As one of the most used functions, the smart TV's multimedia playing, especially online demand is developing rapidly and playing an increasingly important role in the smart TV.

As for the experience of playing and control, there is a big difference between the controlling of a player by a TV remote control and the controlling of a player by a computer mouse in some aspects. To a certain extent, the operation of the remote control is not as convenient as that of the mouse, wherein one point lies in the operation of fast forward or fast backward. According to the features of "cursor movement" and "press to drag" of the mouse, most players allow users to preview an image at a certain time point to determine whether it is the target position to which the user wants to move. To this end, the practice is that when the cursor moves to a certain position of the video playing progress bar, a small window will pop up above the position of the progress bar to display the video image corresponding to this time point. If the user confirms to start playing from this position, then he just directly clicks on the position or drag the progress bar to the position to play it. Due to limits of TV remote control and other reasons, the TV does not have such function, and can only use in the manner of fast forward—buffer playing—progress confirming, to find the time point at which the user wants to fast forward to and then play.

SUMMARY

The present application provides a method and an apparatus for video playing processing and a TV In a first aspect, the present application provides a method for video playing processing, including:

when a video is played by a first thread, initiating a second thread in parallel with the first thread if a preview operation is received, wherein the preview operation is used for indicating a fast forward operation or a fast backward operation on the video;

obtaining, by the second thread, a video clip at a video playing position corresponding to the preview operation in the first thread;

obtaining, by the second thread, at least one frame image decoded from the video clip; and displaying, by the second thread, the at least one frame image on a playing screen of the video played by the first thread.

In a second aspect, the present application provides an apparatus for video playing processing, including: a memory for storing instructions; a processor coupled to the memory and configured to execute the instructions stored in the memory, wherein the processor is further configured to:

when a video is played by a first thread, initiate a second thread in parallel with the first thread if a preview operation is received, wherein the preview operation is used for indicating a fast forward operation or a fast backward operation on the video;

obtain, by the second thread, a video clip at a video playing position corresponding to the preview operation in the first thread;

obtain, by the second thread, at least one frame image decoded from the video clip; and display, by the second thread, the at least one frame image on a playing screen of the video played by the first thread.

In a third aspect, the present application provides a TV including:

a memory, a processor, a communication interface and a display screen; wherein the memory is used for storing an execution instruction, the communication interface is used for receiving a preview operation when a video is played by a first thread; the preview operation is used for indicating a fast forward operation or a fast backward operation on the video;

the processor is used for calling the execution instruction in the memory and performing the following operations:

initiating a second thread in parallel with the first thread if a preview operation is received;

obtaining, by the second thread, a video clip at a video playing position corresponding to the preview operation in the first thread;

obtaining, by the second thread, at least one frame image decoded from the video clip; and displaying, by the second thread, the at least one frame image on a playing screen of the video played by the first thread.

BRIEF DESCRIPTION OF DRAWINGS

In order to describe more clearly technical solutions of embodiments of the present application or the related arts, the accompanying drawings, which will be referred to in the embodiments or the related arts, will be briefly described below. It is apparent that the accompanying drawings are some embodiments of the present application, and for those skilled in the art, other drawings may be obtained from these drawings without creative labor.

DETAILED DESCRIPTION

In order to make objects, technical solutions and advantages of the embodiments of the present application more clear, the technical solutions of the embodiments of the present application will be clearly and completely described below with reference to the accompanying drawings. Obviously, the described embodiments are part of embodiments of the present application, but not all embodiments. All other embodiments obtained by those skilled in the art based on the embodiments of the present application without creative labor are within the scope of the present application.

Figure 1:
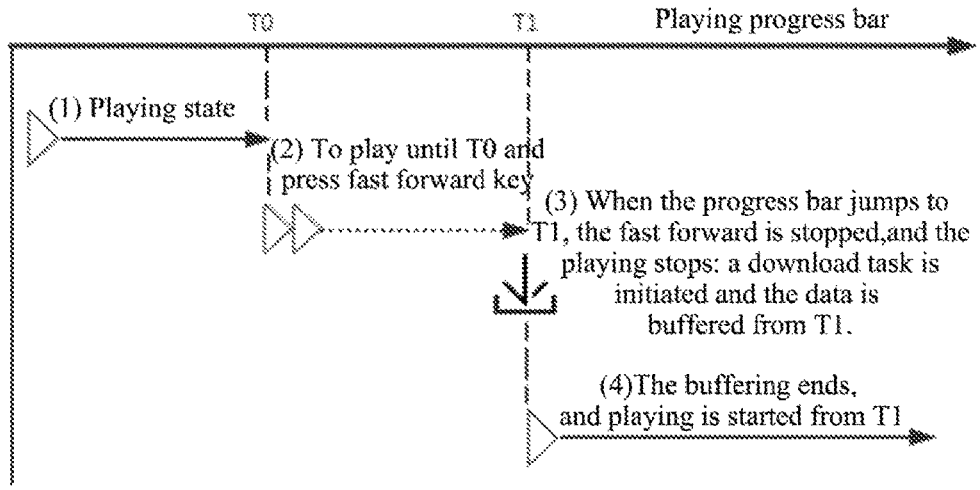
FIG. 1 is a schematic diagram of a fast forward process of a TV video playing in the related art.

FIG. 1 is a schematic diagram of the fast forward process of the TV video playing in the related art. As shown in FIG. 1, the fast forward process of the current smart TV is described. In the process of watching video, at time point T0, if the user wants to make a fast forward (or a fast backward, in the following description only fast forward is taken as an example), then he presses the right key on the remote control or fast forward key on user interface (UI) of the player, and at this time, the current video playing will be paused and the progress bar will be fast forwarded. When the user stops the fast forward operation, the player starts to jump from the current playing position of the progress bar to a fast forward position (for example, to the time point T1) and start buffering. After completion of the buffering, the playing is started from the position of T1, whereas the current video playing will be stopped during the process of fast forward and buffer. If the user needs to continue to make a fast forward after the buffering is finished, the above process is repeated, and likewise, the current video playing will be stopped during the process of fast forward and buffering.

Therefore, the method related in the embodiments of the present application can be applied to a smart television, aiming at solving technical problems of requiring to interrupt the playing of the current video in the above process and to wait for buffering before playing the video at the fast forward or fast backward position and thereby poor user experience.

Hereinafter, the technical solutions of the present application will be described in detail with reference to specific examples. The following specific embodiments may be combined with one another, and the same or similar concepts or processes will not be repeated in certain embodiments.

Figure 2:
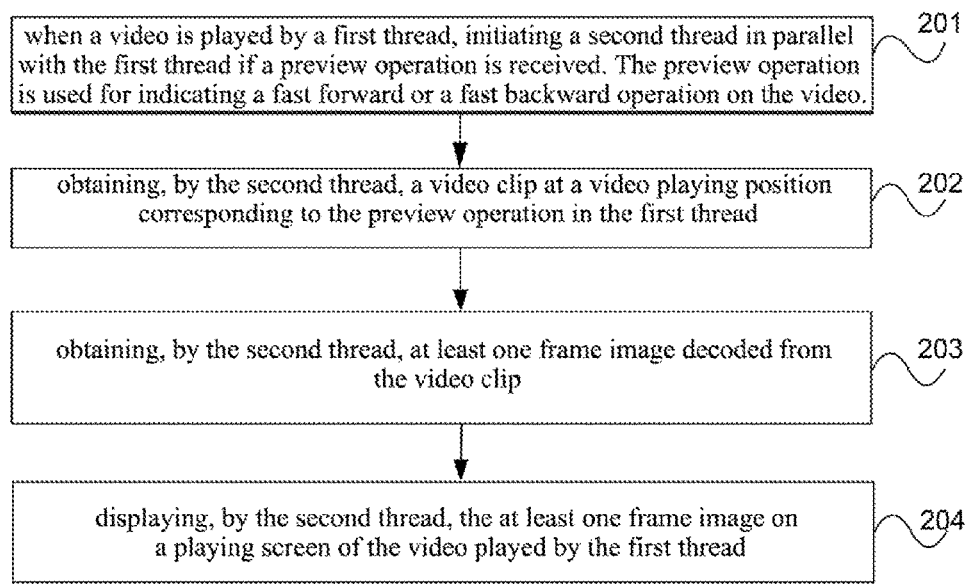
FIG. 2 is a flow diagram of a method for video playing processing provided in some embodiments of the present application.

FIG. 2 is a flow diagram of a method for video playing processing provided in some embodiments of the present application. As shown in FIG. 2, the method of the present embodiment includes:

Step 201, when a video is played by a first thread, initiating a second thread in parallel with the first thread if a preview operation is received. The preview operation is used for indicating a fast forward or a fast backward operation on the video.

Step 202, obtaining, by the second thread, a video clip at a video playing position corresponding to the preview operation in the first thread.

Step 203, obtaining, by the second thread, at least one frame image decoded from the video clip. Step 204, displaying, by the second thread, the at least one frame image on a playing screen of the video played by the first thread.

In embodiments of the present application, when the television plays a video by the first thread, a preview operation may be received, to obtain a video clip at a video playing position corresponding to the preview operation. Wherein, the preview operation may be, for example, a preview operation inputted by a user long pressing a directional key of a remote control, or a preview operation inputted by a user long pressing a directional key or the shortcut key of a keyboard. The preview operation may be used to indicate a fast forward or a fast backward operation on the video. Herein, the fast forward operation and fast backward operation can be understood as: obtaining a video playing position on the progress bar according to a preset step-length and the duration of the preview operation on the basis of the current playing position on the progress bar. For example, if the current playing position corresponding to the video played by the first thread on the playing progress bar is 0 hour 15 minutes 0 second, then the preset step-length corresponding to the fast forward operation is: 1 second of fast forward operation on the progress bar corresponds to 30 seconds of playing progress. At this time, if the duration of the fast forward operation received is 6 seconds, then the playing position of the video corresponding to the fast forward operation on the progress bar is 0 hour 18 minutes 0 second.

In order that the playing of the current video is uninterrupted, the television may, after receiving the preview operation, initiate a second thread parallel to the first thread, to obtain, by the second thread, a video clip at the video playing position corresponding to the preview operation. That is, the video clip is obtained by a thread that is independent of the thread occupied by the download task of the current video playing (i.e., the first thread). Namely, the television runs multiple threads simultaneously to accomplish different tasks, and the multiple threads can be differentiated by the thread identification. Then at least one frame image decoded from the video clip is obtained by the second thread. Finally, the at least one frame image is displayed by the second thread on a playing screen of the video played by the first thread. Since the second thread is independent of the first thread for playing the current video at this time, the above-mentioned fast forward or fast backward operation by the second thread does not affect the playing of the current video, and the case of needing to wait for buffering during the process of fast forward or fast backward, as in the related art, will not occur, which results in a good user experience.

Wherein, the video clip may be a minimum video clip in order to increase the buffering speed.

An implementation form for obtaining a video clip at the video playing position corresponding to the preview operation in said first thread is provided in some embodiments of the present application, wherein the step 202 may includes the following operations:

obtaining a playing resource corresponding to the video, and the video playing position of the preview operation in the playing resource; and downloading, by the second thread, the video clip corresponding to the video playing position, according to the video playing position in the playing resource.

As an example, after receiving the preview operation, the television may first obtain the playing resource corresponding to the video through a thread, and the video playing position of the preview operation in the playing resource. Wherein the thread may be the second thread, or other thread other than the first thread, and the like. Wherein the playing resource may be an address of the video in the network, or a storage location of the video in the local database, for example, a drive letter.

Then the TV obtains, by the second thread, a video frame corresponding to the video playing position according to the video playing position in the playing resource, and obtains a video clip in which the video frame is positioned according to the video frame to download the video clip. As an example, assuming that the obtained video playing position of the preview operation in the playing resource is: 0 hour 15 minutes 0 second of the playing resource, then the above television can download the video clip of the playing resource at 0 hour 15 minutes 0 second by the second thread.

That is, a video frame corresponding to the playing resource at the 0 hour 15 minutes 0 second is obtained, and a video clip in which the video frame is positioned is obtained according to the video frame, to download the video clip.

An implementation form for obtaining at least one frame image decoded from the video clip is provided in some embodiments of the present application, wherein the above step 203 may include the following operations:

When the television uses a second decoder to decode the image of the video played by the first thread, the television may use a first decoder different from the second decoder to decode at least one frame image in the video clip, and then obtain the at least one frame image by the second thread. As the above-mentioned first decoder and the decoder used for the current video playing are independent decoders, when the at least one frame image is decoded, the playing of the current video will not be affected, that is, the case of needing to wait for buffering during the process of fast forward or fast backward, as in the related art, will not occur, which results in a good user experience.

When the television uses a second decoding thread to decode the image of the video played by the first thread, the television may use a first decoding thread different from the second decoding thread to decode at least one frame image in the video clip, and then obtain the at least one frame image by the second thread. As the above-mentioned first decoding thread and the decoding thread used for the current video playing are independent decoding threads, when the at least one frame image is decoded, the playing of the current video will not be affected, that is, the case of needing to wait for buffering during the process of fast forward or fast backward as in the related art will not occur, which results in a good user experience.

Figure 3A:
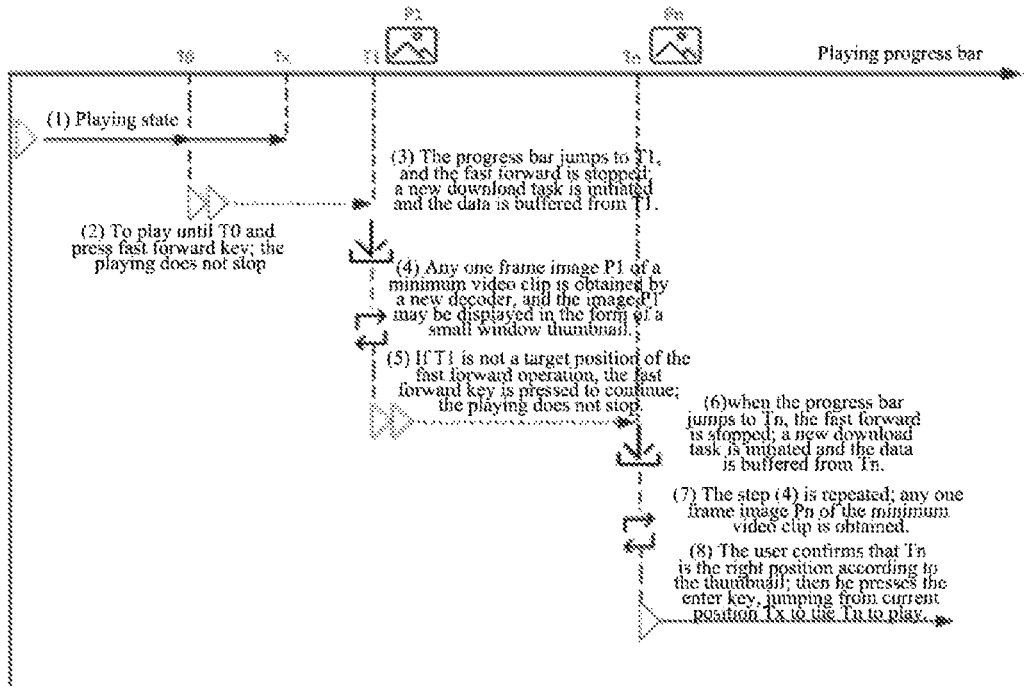
FIG. 3A is a schematic diagram of non-interruptive preview playing provided in some embodiments of the present application.

The fast forward operation is taken as an example. FIG. 3A is a schematic diagram of non-interruptive preview playing provided in some embodiments of the present application. As shown in FIG. 3A, a workflow is as follows:

(1) The video is playing, namely it is in playing state.

(2) The video is played until the time point T0; the user inputs a fast forward operation (which can be done by pressing the fast forward key of the remote control) to start the fast forward process. It should be noted that the current video playing does not need to stop at this time.

(3) Fast forward to the video playing position corresponding to the progress bar T1 and then the user stops the fast forward operation. At this point, through a new download task, which is independent of the current video playing download task, namely through a new thread (e.g., the second thread) independent of the thread (e.g., the first thread) occupied by the current video playing download task, a minimum video clip at the video playing position corresponding to T1 will be downloaded, e.g., a Ts clip and be cached in the independent buffer zone. It should be noted that unlike the download in FIG. 1, it is possible to download only the minimum video clip, whereas the solution in FIG. 1 tends to cache a large amount of data before playing is started, which results in a slower playing speed.

(4) Any one frame image P1 of the minimum video clip (e.g., the first frame image) may be obtained using a new decoder (e.g., the first decoder) independent of the current video playing decoder (e.g., the second decoder). The image P1 may be displayed in the form of a small window thumbnail at the video playing position corresponding to the progress bar T1, that is, the thumbnail of at least one frame image is displayed in the preview window. Further, the preview window may also be an operating focus, that is, a focus can be obtained in the window so that the user may press the enter key to directly play the video corresponding to the video playing position.

Wherein the new decoder can be implemented through a software decoder, or a hardware decoder independent of the decoder for the current video playing. The above-described process does not affect the decoding operation of the video currently played.

(5) by the image displayed by the video preview window, if the user finds that T1 is the target position to be fast forwarded to, then he may directly press the enter key to directly jump from Tx (assuming the current playing position is Tx) to T1 and start playing. At this point, since the first video clip has been downloaded, uninterrupted fast forward playing can be achieved. If T1 is not the target position to be fast forwarded to, then the user may press the fast forward key to continue fast forward.

(6) The fast forward is stopped at Tn position, then it will start to download and cache the minimum video clip.

(7) The operations in the above step (4) are repeated to obtain any frame image Pn of the minimum video clip.

(8) If the user confirms that Tn is the target position to be fast forwarded to, then he may directly press the enter key to jump directly to the target position to play. Although the preview images (T1, Tn) at a plurality of fast forward points are viewed in the above-mentioned process, the playing of the current video does not need to be interrupted in the whole process.

In summary, the operation of the remote control that is transformed from the operations of direct fast forward or fast backward to the target position for playing to the operation of preview at the target position to be fast forwarded or fast backwarded to the target position for previewing, simulates the cursor's movement on the progress bar on a computer player, so that one-time jumping to the target position to play is achieved by previewing and confirming the fast-forward or fast-forward position, and current video playing is not affected during the process of fast forward or fast backward, and therefore, the user does not need to wait for buffering as otherwise needed in the related art, which results in a good user experience.

Further, only the minimum video clip at the video playing position corresponding to the fast forward or fast backward operation needs to be downloaded. This results in high speed and high efficiency.

According to the methods provided in embodiments of the present application, when the video is played by a first thread, if a preview operation is received, then a second thread in parallel with the first thread is initiated, wherein the preview operation is used for indicating a fast forward or fast backward operation on the video; further, a video clip at a video playing position corresponding to the preview operation in the first thread is obtained by the second thread; then at least one frame image decoded from the video clip is obtained by the second thread; and finally the at least one frame image is displayed by the second thread on a playing screen of the video played by the first thread. As the downloading and the decoding of the video clip do not occupy the current video playing resource, it is achieved that the current video playing is not affected during the process of the fast forward or fast backward. Therefore during the process of the fast forward or fast backward, it is avoided that the problems of needing to interrupt the playing of the current video in the process of fast forward or fast backward and wait for buffering before playing a video at the position reached by the fast forward or fast backward, which results in a good user experience.

Some embodiments of the present application provide another implementation form, wherein after step 204, the following operations may be further performed:

When the at least one frame image is selected, the video will start to play from the video playing position corresponding to the at least one frame image by the second thread.

After the at least one frame image is displayed, the user needs to judge whether the video playing position corresponding to the at least one frame image is a target playing position, thereby determining whether to start playing the video from the target playing position. Upon determining that the video is played from this playing position, the television may receive a video playing instruction operated by the user by selecting the at least one frame image, and then may play the video in accordance with the video playing instruction. That is, the video playing instruction is used for instructing to start playing video from the video playing position corresponding to the at least one frame image, namely, starting to play the video directly from the video playing position corresponding to the at least one frame image after receiving the video playing instruction.

Further, the video playing instruction can be implemented as follows:

1) Assuming that the video playing instruction is also used for instructing to return to the current video playing position for playing, the user can input "return" (or "cancel") through the remote control to cancel the preview window of the at least one frame image, and the process of fast forward ends.

2) Assuming that the video playing instruction is used for instructing to start playing video from the video playing position corresponding to the at least one frame image, the user can input "enter" (or "play") through the remote control to select the at least one frame image, and then cancel the preview window of the at least one frame image, and after jumping from the current video playing position to the target position by the second thread, the video starts to play.

3) Assuming that the video playing instruction is further used for instructing to continue fast forward or fast backward operation, the user can input "right key" (or "fast forward") by the remote control to cancel the preview window of the at least one frame image and start a new fast forward process. The above steps in FIG. 3A are repeated.

Further, the step 204, for example, may be implemented as follows:

displaying a playing screen in a playing window by a first thread, and displaying the at least one frame image in a preview window by a second thread. Wherein the playing window in an on-screen display (OSD) layer is located below the preview window in the OSD layer so that the user can preview the at least one frame image corresponding to the preview operation without affecting watching the current video, which results in a better user experience. Wherein the preview window may be, for example, a window arranged at the video playing position corresponding to the video playing progress bar.

In order not to affect the user to watch the video currently played, thumbnails of images can be displayed in the video preview window. At this time, if the preview window is an operating focus, the user can input "enter" (or "play") through the remote control to select the preview window so that when the preview window is selected, the TV switches the contents displayed in the playing window to the at least one frame image obtained by the second thread after decoding, and closes the first thread so as to jump from the current video playing position to the target position and start playing.

In embodiments of the present application, as for processing of sound, since two videos are simultaneously played, i.e., the current main video and the preview video of fast forward or fast backward, it is possible to make mute processing for the preview video so as not to affect the playing of the current main video. Of course, it can also be the case that small window that is previewed is played with sound while current main video window is automatically muted.

Figure 3B:
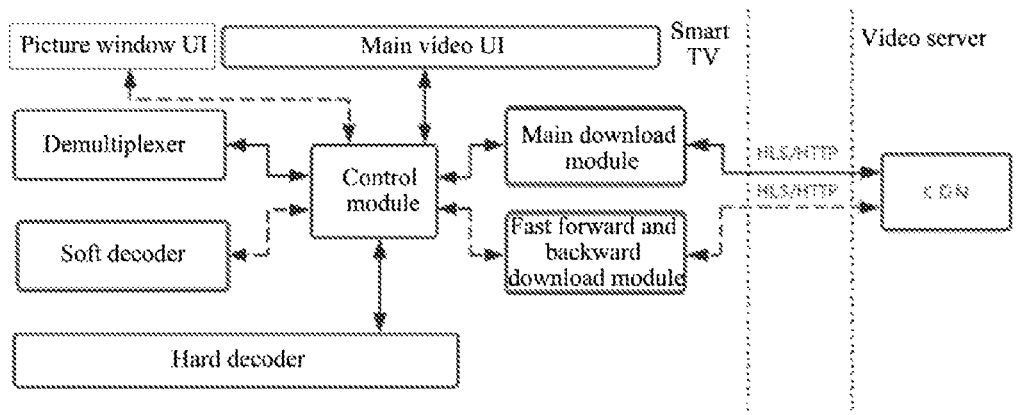
FIG. 3B is a block diagram of a system provided in some embodiments of the present application.

FIG. 3B is a block diagram of a system provided in some embodiments of the present application. As shown in FIG. 3B, a control module of a smart television is responsible for coordinating the work of each module. For example: obtaining playing and control instructions from UI, obtaining media data through a download module, and performing e.g., demultiplexing and decoding operations, and finally rendering the processed video data on the UI.

Download module: includes a main download module and a fast forward and backward download module. The main download module and the fast forward and backward download module provide network protocols for supporting e.g., HTTP Live Streaming (HLS)/HyperText Transfer Protocol (HTTP), etc., and are responsible for downloading video data from the video server of a remote Content Delivery Network (CDN).

Demultiplexer: responsible for separation of audio and video in the video data.

Soft decoder: a software decoder, it decodes by means of software and its performance is usually inferior to that of a hard decoder, but is enough for obtaining a fast forward or fast backward image. With introduction of the soft decoder, it is possible to avoid the case that the decoding of a fast forward or fast backward video clip seizes hard decoding resources of the video currently played, resulting in occurrence of interruption of the video playing.

Hard decoder: a standalone hardware decoder, it decodes by means of hardware and has better performance. Most of the smart TVs only support one-channel hardware decoding, which is the reason why a soft decoding is introduced. When the TV only supports one-channel hardware decoding, the hard decoder is responsible for decoding the current playing video.

Picture window UI: a thumbnail of the preview video is displayed in a small window in corresponding position of the progress bar, floating above the main video UI, this can obtain a focus and a receiving key so as to achieve direct playing by pressing "enter" at the fast forward or fast backward position.

Main Video UI: used for playing the current main video. The playing of the main video UI is not affected by the playing of the preview video.

The flow of the method of the present application will be described in detail below:

First it is necessary to create a playing control sub-module and a fast forward monitoring sub-module, both of which belong to a control module. Wherein the playing control sub-module needs to constantly monitor whether there is a fast forward or fast backward operation input from the user, that is, whether there is a fast forward or fast backward event.

A brief process of normal video playing is as follows: the user selects a video and starts to play. First, the main download module starts downloading video data. If the amount of the downloaded data reaches a certain level, for example, download of a clip is completed, data processing is started. Otherwise, the download will continue. The data processing is mainly demultiplexing and decoding. After decoding, video data will be rendered to the main video UI interface and then the user may see playing of the video. And it is judged whether downloads of all the clips are completed, and if not, then the process is continued, otherwise the process ends.

The fast forward process (similar to the fast backward process) will be described as follows:

At the beginning of playing, the fast-forward monitoring sub-module enters the monitoring loop and continuously monitors whether there is a fast forward event. If there is a fast forward event, then the fast forward information will be obtained, e.g., a time point Tn.

A separate download task is initiated (i.e., initiating a separate thread, which is implemented by the fast forward and backward download module) to start downloading the minimum video clip corresponding to the Tn, and the downloading does not stop until the download is completed or the demultiplexing/decoding conditions are met.

The downloaded video clip is demultiplexed and decoded, and the first frame image after decoding is obtained, and then the decoding is stopped. A small window is created at the position Tn of the progress bar above the main video UI layer, to display the first frame image (that is, a thumbnail of the first frame image is displayed through the picture window UI) and the current focus is obtained. The user determines whether to jump to this position to start playing the video according to the displayed image.

Figure 4:
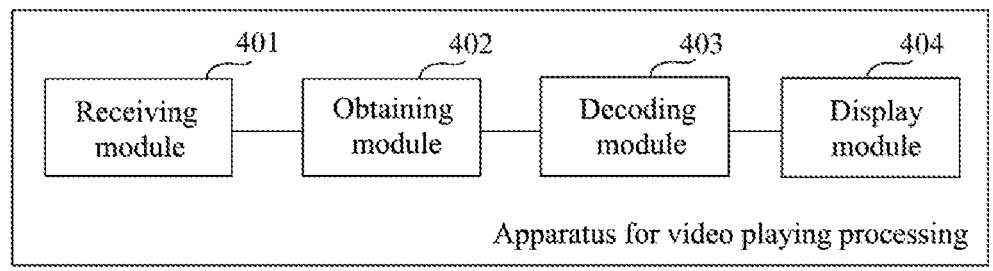
FIG. 4 is a structure schematic diagram of an apparatus for video playing processing provided in some embodiments of the present application.

FIG. 4 is a structure schematic diagram of an apparatus for video playing processing provided in some embodiments of the present application. As shown in FIG. 4, the apparatus for video playing processing of the present embodiment includes: a receiving module 401, an obtaining module 402, a decoding module 403, and a display module 404.

Wherein the receiving module 401 is used for receiving a preview operation inputted by the user through a remote control, when the video is played. The preview operation is a fast forward operation or a fast backward operation.

The obtaining module 402 is used for obtaining a video clip at the video playing position corresponding to the preview operation. The video clip is obtained by a thread that is independent of the thread occupied by the download task of the video currently played.

The decoding module 403 is used for decoding at least one frame image of the video clip by a decoder independent of the decoder for the current video playing, to obtain the at least one frame image after decoding.

The display module 404 is used for displaying the at least one frame image.

As an implementable form, the video clip is a minimum video clip.

As an implementable form, the receiving module 401 is further used for receiving a video playing instruction operated by the user. The video playing instruction is used for instructing to start playing video from a video playing position corresponding to the at least one frame image.

The apparatus further includes:

a processing module for playing the video according to the video playing instruction.

As an implementable form, the display module 404 is used for:

displaying a thumbnail of the at least one frame image in the video preview window.

The apparatus of the present embodiment can be used for carrying out the technical solution of the foregoing method embodiments, and the implementation principle and technical effect are similar to the ones described above and thus are not repeated here.

The present application also provides an apparatus for video playing processing including: a memory for storing instructions; a processor coupled to the memory and configured to execute the instructions stored in the memory, wherein the processor is further configured to:

when a video is played by a first thread, initiate a second thread in parallel with the first thread if a preview operation is received, wherein the preview operation is used for indicating a fast forward operation or a fast backward operation on the video; obtain, by the second thread, a video clip at a video playing position corresponding to the preview operation in the first thread; obtain, by the second thread, at least one frame image decoded from the video clip; and display, by the second thread, the at least one frame image on a playing screen of the video played by the first thread.

The processor in the apparatus for video playing processing of the present embodiment may further be configured to carry out any one of the methods for video playing processing provided in the foregoing embodiments of the present application, and the implementation principle of which is similar to the one described above and thus are not repeated here.

Figure 5:
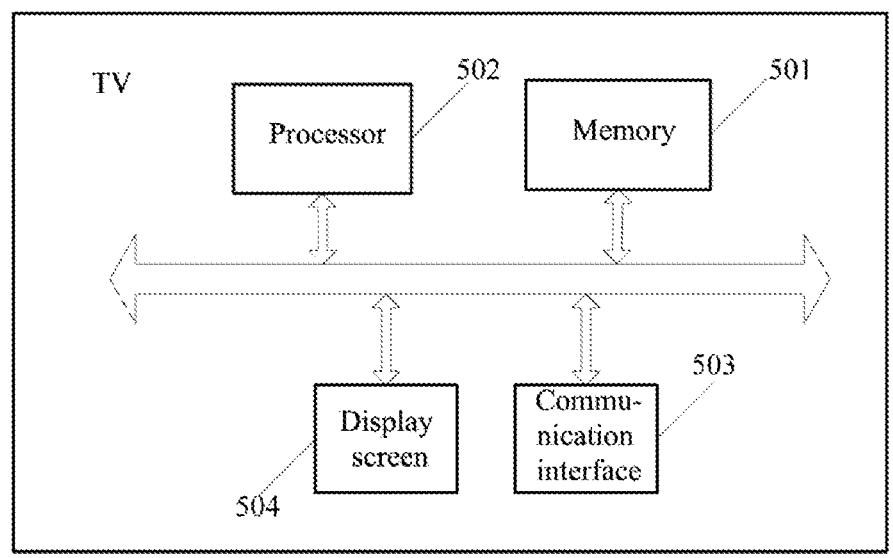
FIG. 5 is a structure schematic diagram of a TV provided in some embodiments of the present application.

FIG. 5 is a structure schematic diagram of a TV provided in some embodiments of the present application. As shown in FIG. 5, the television of the present embodiment may include: a memory 501, a processor 502, a communication interface 503, and a display screen 504; wherein the memory 501 is used for storing a program; the program may exemplarily include program code including computer operating instructions. The memory 501 may include random access memory (RAM), or may also include non-volatile memory, such as at least one magnetic disk storage.

The processor 502 is used for executing the program stored in the memory 501 and carrying out the technical solutions provided in the method embodiments of the present application, the implementation principle and technical effect of which are similar to the ones described above and thus are not repeated here.

The communication interface 503 is used for receiving the preview operation when a video is played by a first thread; the preview operation is used for indicating a fast forward or fast backward operation on the video. The function of the receiving module may be implemented through the communication interface 503.

The display screen 504 is used for displaying video images; and the function of the display module may be implemented through the display screen 504.

The functions of the obtaining module, the decoding module, and the processing module in the above-mentioned apparatus may be implemented by the processor 502.

The above components communicate with each other via one or more buses. It will be appreciated by those skilled in the art that the structure of the apparatus shown in FIG. 5 is not intended to limit the present application and the structure may be of a bus structure or a star structure and may further include more or less components than shown in the figure, or a combination of some components, or different component arrangements.

It is to be noted that for a mobile terminal embodiment, since it substantially corresponds to a method embodiment, relevant sections can refer to the corresponding descriptions of the embodiments of the method.

It will be appreciated by those skilled in the art that all or part of the steps of implementing the method embodiments described above may be accomplished by hardware related to program instructions and the program may be stored in a computer readable storage medium, and when the program is executed, the steps including the steps of the above method embodiment will be performed; and the foregoing storage medium includes various kinds of media that may store program codes, such as a ROM, a RAM, a magnetic disk, or an optical disk.

Finally, it should be noted that the above embodiments are merely illustrative of the technical solutions of the present application and are not intended to limit these technical solutions; while the present application has been described in detail with reference to the foregoing embodiments, it will be understood by those skilled in the art that, the technical solutions described in the foregoing embodiments can be modified, or some or all of the technical features therein can be equivalently replaced; and these modifications and replacements do not cause the essence of the corresponding technical solutions to depart from scope of the technical solutions of embodiments of the present application.

What is claimed is:

1. A method for video playing processing performed by a video rendering device, comprising:
    receiving a preview operation for a video in a form of a long press on a predetermined key on a remote control unit while the video is being played in a playing window of the video rendering device by a first thread running in the video rendering device, wherein the preview operation is used for indicating a fast forward operation or a fast backward operation on the video;
    upon detecting an end of the long press:
        initiating a second thread independent of the first thread in the video rendering device, determining a time length for the long press, and determining a video playing position of the preview operation based on a current video position for the video being played and the time length for the long press;
        determining a playing resource corresponding to the video;
        downloading, by the second thread, a video clip corresponding to the video playing position, according to the video playing position in the playing resource;
        determining, by the second thread, at least one frame image decoded from the video clip; and
        displaying, by the second thread, the at least one frame image in a preview window of the video rendering device, and displaying the video in the playing window by the first thread without interruption, wherein the playing window in an OSD layer is located below the preview window in the OSD layer; and
    when the preview window is selected, switching contents being displayed in the playing window obtained by the first thread to the at least one frame image obtained by the second thread after decoding, and closing the first thread and the preview window.

2. The method of claim 1, wherein the determining, by the second thread, at least one frame image decoded from the video clip comprises:
    reading, after a first decoder decodes at least one frame image of the video clip, the at least one frame image by the second thread, wherein the first decoder is different from a second decoder and is used for decoding an image of the video being played by the first thread.

3. The method of claim 1, wherein the video clip is a minimum video clip.

4. The method of claim 1, wherein the displaying the at least one frame image in the preview window comprises:
    displaying a thumbnail of the at least one frame image in the preview window.

5. The method of claim 1, wherein a layer on the preview window includes an operating focus.

6. The method of claim 1, wherein the determining, by the second thread, at least one frame image decoded from the video clip comprises:
    reading, after a first decoding thread decodes at least one frame image of the video clip, the at least one frame image by the second thread, wherein the first decoding thread is different from a second decoding thread and is used for decoding an image of the video being played by the first thread.

7. The method of claim 1, wherein the playing resource is an address of the video in network, or a local address where the video is stored in the video rendering device.

8. An apparatus for video playing processing, comprising: a memory used for storing instructions; a processor coupled to the memory and configured to execute the instructions stored in the memory, wherein the processor is configured to:
    receive a preview operation for a video in a form of a long press on a predetermined key on a remote control unit while the video is being played in a playing window of the apparatus by a first thread running in the apparatus, wherein the preview operation is used for indicating a fast forward operation or a fast backward operation on the video;
    upon detecting an end of the long press:
        initiate a second thread independent of the first thread in the apparatus, determine a time length for the long press, and determine a video playing position of the preview operation based on a current video position for the video being played and the time length for the long press;
        determine a playing resource corresponding to the video;
        download, by the second thread, a video clip corresponding to the video playing position, according to the video playing position in the playing resource;
        determine, by the second thread, at least one frame image decoded from the video clip; and
        display, by the second thread, the at least one frame image in a preview window of the apparatus, and display the video in the playing window by the first thread without interruption, wherein the playing window in an OSD layer is located below the preview window in the OSD layer; and
    when the preview window is selected, switching contents being displayed in the playing window obtained by the first thread to the at least one frame image obtained by the second thread after decoding, and closing the first thread and the preview window.

9. The apparatus of claim 8, wherein the processor is further configured to:
    read the at least one frame image by the second thread, after a first decoder decodes the at least one frame image of the video clip, wherein the first decoder is different from a second decoder and is used for decoding an image of the video being played by the first thread.

10. The apparatus of claim 8, wherein the processor is further configured to:
    displaying a thumbnail of the at least one frame image in the preview window.

11. The apparatus of claim 8, wherein a layer on the preview window includes an operating focus.

12. The apparatus of claim 8, wherein the processor is further configured for:

reading the at least one frame image by the second thread, after a first decoding thread decodes the at least one frame image of the video clip, wherein the first decoding thread is different from a second decoding thread and is used for decoding an image of the video being played by the first thread.

13. The apparatus of claim 8, wherein the playing resource is an address of the video in network, or a local address where the video is stored in the apparatus.

14. A television, comprising:
a memory, a processor, a communication interface and a display screen; wherein the memory is configured for storing instructions, wherein the communication interface is configured for receiving a preview operation for a video in a form of a long press on a predetermined key on a remote control unit while the video is being played in a playing window on the display screen by a first thread running in the television, wherein the preview operation is used for indicating a fast forward operation or a fast backward operation on the video, and wherein the processor, when executing the instructions, is configured for:
upon detecting an end of the long press:
  initiating a second thread independent of the first thread in the television;
  determining a time length for the long press;
  determining a video playing position of the preview operation based on a current video position for the video being played and the time length for the long press;
  determining a playing resource corresponding to the video;
  downloading, by the second thread, a video clip corresponding to the video playing position, according to the video playing position in the playing resource;
  determining, by the second thread, at least one frame image decoded from the video clip; and
  displaying, by the second thread, the at least one frame image in a preview window on the display screen, and displaying the video in the playing window by the first thread without interruption, wherein the playing window in an OSD layer is located below the preview window in the OSD layer; and
when the preview window is selected, switching contents being displayed in the playing window obtained by the first thread to the at least one frame image obtained by the second thread after decoding, and closing the first thread and the preview window.

\* \* \* \* \*